(12) United States Patent
Shultz et al.

(10) Patent No.: US 7,726,343 B2
(45) Date of Patent: Jun. 1, 2010

(54) FLUID HANDLING APPARATUS, MANIFOLD THEREFOR AND METHOD OF MAKING SAME

(75) Inventors: Eric I Shultz, Mount Joy, PA (US); Jeffrey B Murphy, Millersville, PA (US); Thomas L Crandall, York, PA (US)

(73) Assignee: RTI Technologies, Inc., York, PA (US)

( * ) Notice: Subject to any disclaimer, the term of this patent is extended or adjusted under 35 U.S.C. 154(b) by 0 days.

(21) Appl. No.: 12/124,330

(22) Filed: May 21, 2008

(65) Prior Publication Data

US 2008/0289711 A1 Nov. 27, 2008

Related U.S. Application Data

(60) Provisional application No. 60/924,650, filed on May 24, 2007.

(51) Int. Cl.
*F16K 27/00* (2006.01)
(52) U.S. Cl. .......................................... 137/884; 62/292
(58) Field of Classification Search ................. 137/884; 62/292
See application file for complete search history.

(56) References Cited

U.S. PATENT DOCUMENTS

| | | | | |
|---|---|---|---|---|
| 3,438,463 | A * | 4/1969 | Gruber | 184/7.4 |
| 3,457,943 | A * | 7/1969 | Kawabata | 137/269 |
| 4,507,707 | A * | 3/1985 | Willis | 361/679.01 |
| 5,094,087 | A | 3/1992 | Gramkow | |
| 5,094,268 | A * | 3/1992 | Morel et al. | 137/560 |
| 5,467,608 | A | 11/1995 | Cording et al. | |
| 5,533,358 | A | 7/1996 | Crandall et al. | |
| 5,570,590 | A | 11/1996 | Hansen et al. | |
| 5,598,714 | A | 2/1997 | Strout et al. | |
| 6,302,149 | B1 * | 10/2001 | Sato et al. | 137/884 |
| 6,834,669 | B2 * | 12/2004 | Seyfarth | 137/354 |
| 6,874,537 | B2 * | 4/2005 | Hayashi et al. | 137/884 |
| 6,892,764 | B2 * | 5/2005 | Rodrigues et al. | 137/884 |
| 2002/0079695 | A1 * | 6/2002 | Campbell et al. | 285/26 |
| 2004/0221588 | A1 * | 11/2004 | Stein | 62/84 |

OTHER PUBLICATIONS

International Search Report and Written Opinion; International Application No. PCT/US08/07320; International Filing Date: Jun. 12, 2008, 9 pages.

International Preliminary Report on Patentability mailed Aug. 12, 2009 in International Application No. PCT/US08/006653; International Filing Date: May 23, 2008, 5 pages.

* cited by examiner

*Primary Examiner*—John Fox
(74) *Attorney, Agent, or Firm*—Antonelli, Terry, Stout & Kraus, LLP.

(57) ABSTRACT

A multi-block manifold facilitates assembly of the manifold in a fluid handling apparatus during manufacture and disassembly and removal of a secondary manifold block of the manifold during service without disconnecting external tubes and flow control devices from the manifold. The external tubes are isolated and integral to a primary manifold block of the manifold which is permanently mounted in the apparatus and the flow control devices are integral to the secondary manifold block which is quickly, releasably secured to the primary manifold block in the apparatus.

6 Claims, 6 Drawing Sheets

Section II-II

Section V V

US 7,726,343 B2

FLUID HANDLING APPARATUS, MANIFOLD THEREFOR AND METHOD OF MAKING SAME

RELATED APPLICATION

This application under 35 U.S.C. §111(a) claims the benefit of earlier filed provisional application under 35 U.S.C. §111(b), application Ser. No. 60/924,650, filed May 24, 2007. The disclosure of the provisional application Ser. No. 60/924,650 is hereby incorporated by reference.

TECHNICAL FIELD

The present invention relates to an improved fluid handling apparatus having a complex flow circuit, a manifold therefor, and a method of making same, which enable fluid flow in the apparatus between a multiplicity of devices and ports, ease of assembly, connection to external devices and efficient replacement of key components. In one form of the invention the apparatus is a refrigerant recycling machine.

BACKGROUND AND SUMMARY

Methods and apparatus are known for construction of manifolds to direct and control fluids in a complex flow circuit. Typically, flow paths are machined in a metal block in such a configuration as to direct fluid in a logical manner between several control devices. A metal block accomplishes the same paths as could be done with several fittings and interconnecting tubes between the various control devices.

Present manifold designs, for example that disclosed in U.S. Pat. No. 5,094,087, have an inherent problem in that they can be very difficult to assemble into equipment during initial manufacture and, more importantly, difficult and time consuming for repair technicians to diagnose and correct problems in the field. In addition to component malfunctions, debris which may enter the pathways in the manifold or ports of control devices will cause an operational malfunction. The manifold typically cannot be cleared using conventional means and must be partially disassembled or replaced in its entirety. The present manifold design necessitates uncoupling external tubes, devices and wiring harnesses. There is the possibility of wiring connections being made incorrectly during reassembling. Also, special tools are often required and space limitations make reassembly difficult.

The present invention is directed to an improved fluid handling apparatus having a complex flow circuit, a manifold therefor and a method of making the same, which solve these problems through a multi-block manifold design. The manifold comprises a primary manifold block mountable, e.g. permanently mounted, in the fluid handling apparatus, and a secondary manifold block mountable on the primary manifold block. At least one quick-connect connector is provided for quickly, releasably securing the secondary manifold block on the primary manifold block. A plurality of fluid flow paths are provided in the primary and secondary manifold blocks. A plurality of flow control devices are provided on the manifold for controlling fluid flow in the fluid flow paths of the manifold and complex flow circuit of the apparatus. A plurality of manifold ports with connections for external tubes are provided to convey fluid to and from the fluid flow paths in the manifold. According to the invention, the plurality of manifold ports with connections for external tubes are isolated and integral to the primary manifold block and the plurality of flow control devices are integral to the secondary manifold block. This facilitates assembly of the manifold in the apparatus during manufacture, and disassembly and removal of the secondary manifold block from the apparatus during service without disconnecting external tubes and flow control devices from the manifold. In the event of a malfunction within the manifold, the secondary manifold block can be quickly disconnected and removed from the primary manifold block and replaced with a new one and the defective block returned to the factory for diagnosis and repair.

A further feature of the invention is that the plurality of flow control devices of the manifold include electrically operated flow control devices and the manifold includes a wiring harness integral to the secondary manifold block. The wiring harness has wires electrically connected to the electrically operated flow control devices and connected to a common electrical plug. Means are provided on the primary and secondary manifold blocks for aligning the blocks with respect to each other during mounting of the secondary manifold block on the primary manifold block. The means for aligning the blocks and the electrical plug of the wiring harness prevent assembly errors when the two blocks are connected.

The method of the invention for making a manifold for directing and controlling fluid in a complex flow circuit of a fluid handling apparatus, such as a refrigerant recycling machine, comprises providing a multi-block manifold according to the invention and installing the multi-block manifold in the fluid handling apparatus with the primary manifold block permanently mounted in the apparatus and the secondary manifold block quickly, releasably secured on the primary manifold block. The method further includes providing a wiring harness integral to the secondary manifold block with wires of the harness electrically connected to electrically operated flow control devices of the manifold on the secondary manifold block thereby facilitating the assembly of the manifold in the apparatus during manufacture and the disassembly and removal of the secondary manifold block during service without disconnecting external tubes and flow control devices from the manifold.

These and other features and advantages of the invention will become more apparent when taken with the following detailed description of an example embodiment of the invention which is illustrated in the accompanying drawings.

DETAILED DESCRIPTION

Figure 1:
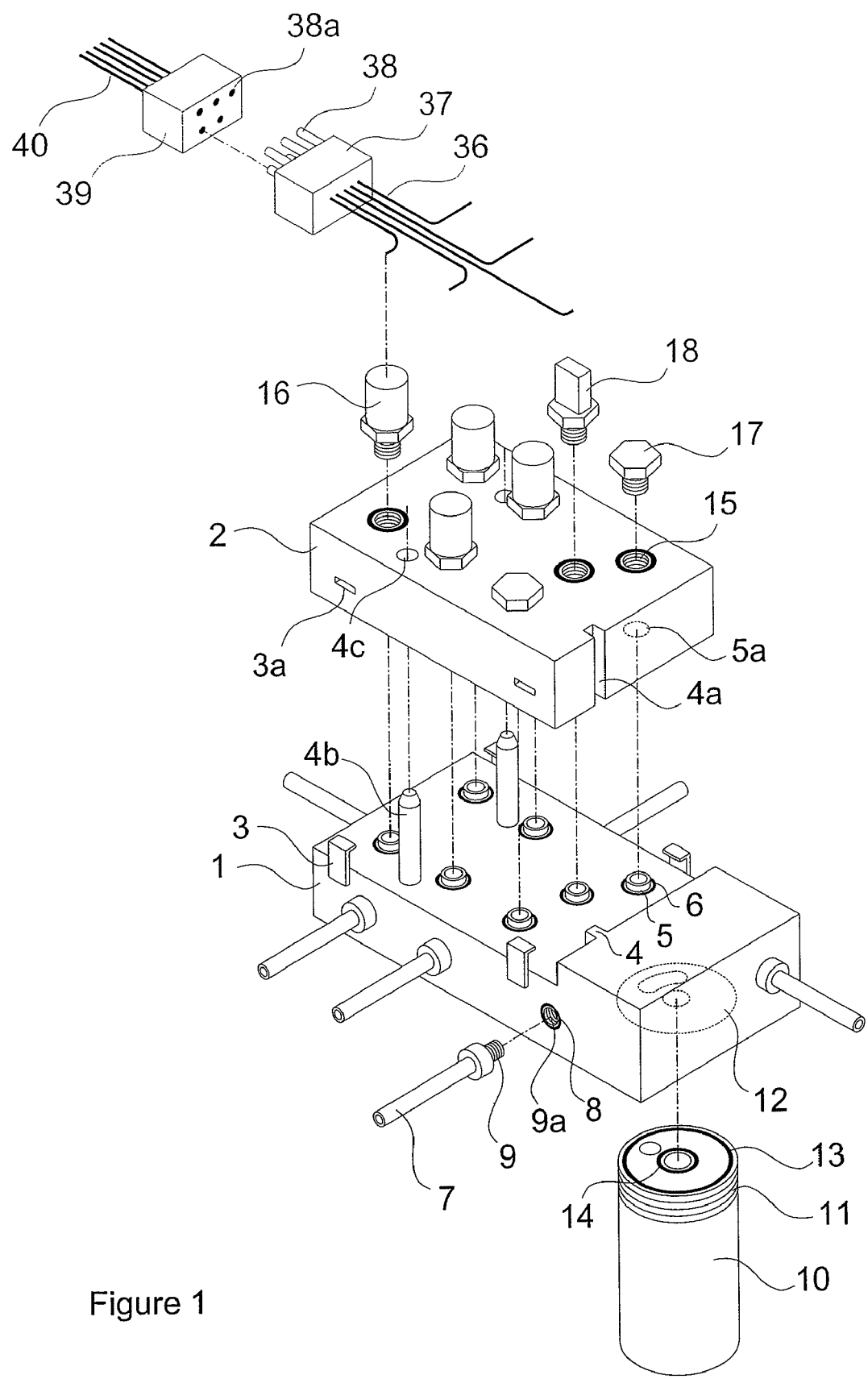
FIG. 1 is a side view from above and to one side of a multiple block manifold according to one embodiment of the invention, parts of the manifold being shown in a disassembled configuration.
Figure 4:
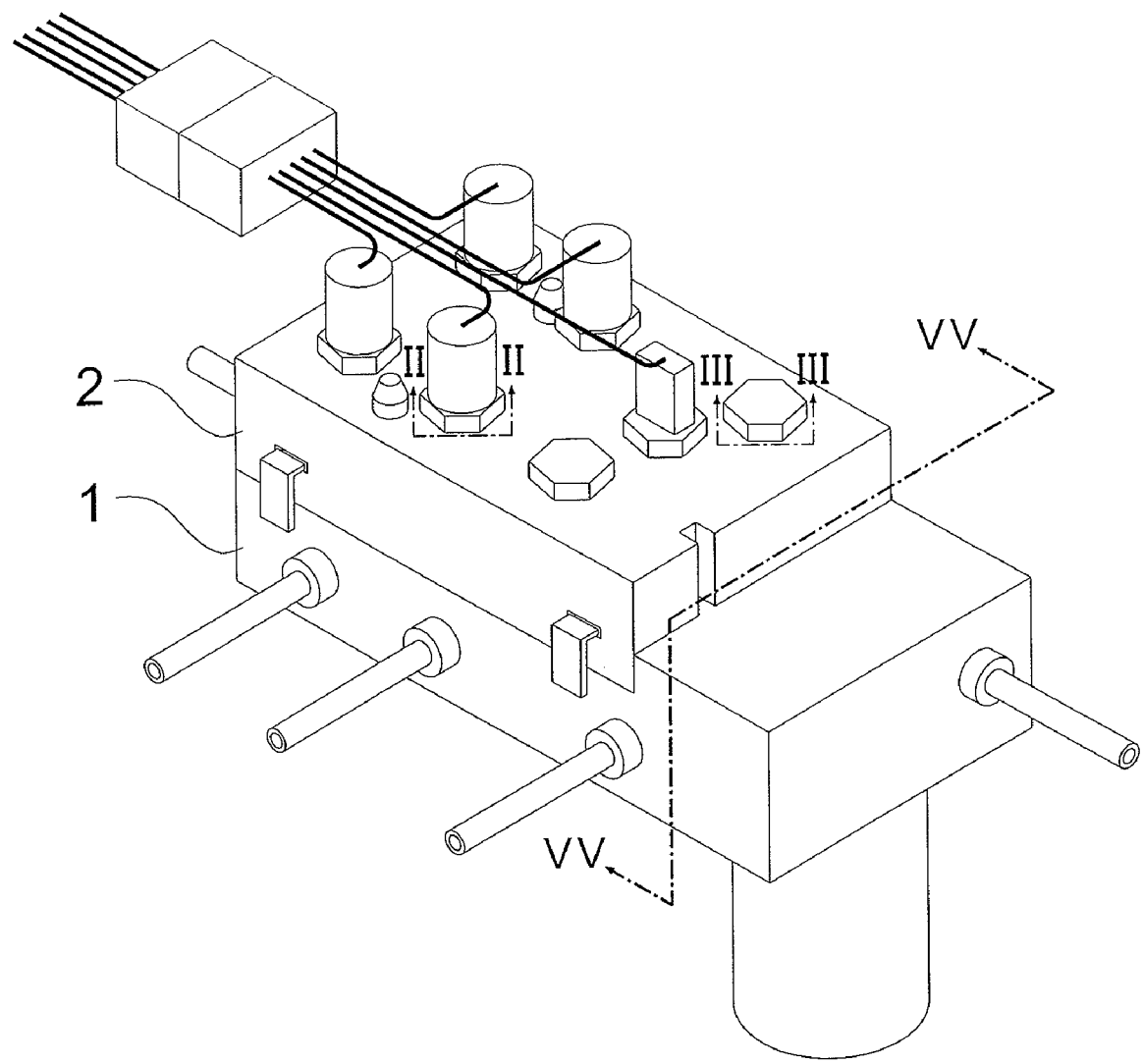
FIG. 4 is a side view from above and to one side of the multiple block manifold of FIG. 1, shown in an assembled configuration.

Referring now to the drawings, FIGS. 1 and 4 show a multiple block manifold according to one embodiment of the invention for use in a fluid handling apparatus of the invention having a complex flow circuit. The apparatus is a refrigerant recycling machine which is shown schematically in FIG. 6. The multiple block manifold has a primary manifold block 1 and a secondary manifold block 2 which are machined components (typically made of aluminum, steel or other machinable substances). The blocks 1 and 2 are connected to each other utilizing at least one quick-connect connector. In the example four quick-connect connectors in the form of clips 3 which engage slots 3a, are employed. Bolts or other connection means can also be employed. The two blocks are designed with alignment means so as ensure they are assembled correctly and critical matting surfaces are not damaged. The alignment means includes a tab 4 in the block 1 which mates with a slot 4a in the block 2. Further, the alignment means comprises studs 4b permanently attached to block 1. The studs mate with holes 4c in manifold block 2 to ensure pre-alignment of the two blocks prior to engaging other mating surfaces.

Each port 5 on a mating surface of the primary block 1 is designed with a raised male configuration so as to align with a female configuration 5a of an opposed port on a mating surface on the secondary block 2. A circular groove around each port 5 retains an O-ring 6 which compresses when the mating surfaces of the two blocks are assembled together to seal against pressure or vacuum at the connection between the blocks about aligned, opposing pairs of the ports in the opposed mating surfaces of the blocks. Other means for sealing the connections between the two manifolds blocks may be used.

External tubes 7 of the apparatus flow circuit are connected to the primary block 1 at ports in the outer sides of the block. The ports are designed with connections to accept the tubes 7. In FIG. 1 the tubes 7 have an external thread male fitting 9 which mates with a connection at the port in the form of an internal thread 9a about the port in the primary manifold block. A circular groove around each port 9a retains an O-ring 8 which compresses when the tube fitting is tightened into the port. Other types of connections, such as a flair type connection, can be used to connect the tubes to the manifold block.

Other devices, such a filter 10, are designed to attach to the primary manifold block. The filter 10 is designed with an external male thread 11 which mates with an internal thread female port 12 in the primary manifold block 1. Circular grooves on the upper surface of the filter 10 retain o-rings 13 and 14 which compress when the filter is tightened in the port. The filter can be designed with one or many grooves and O-rings to enable a desired flow between the components.

Other devices such as a suction accumulator, pressure relief valve or a fluid container can be designed for connection to the primary manifold block 1. Connection means for these devices are not limited to the threaded type as described above.

The secondary manifold block is designed with multiple ports 15 for mounting of various fluid flow control devices. Shown for example in FIG. 1 are a solenoid valve 16, a check valve 17 and a pressure switch or pressure transducer 18.

Figure 2:
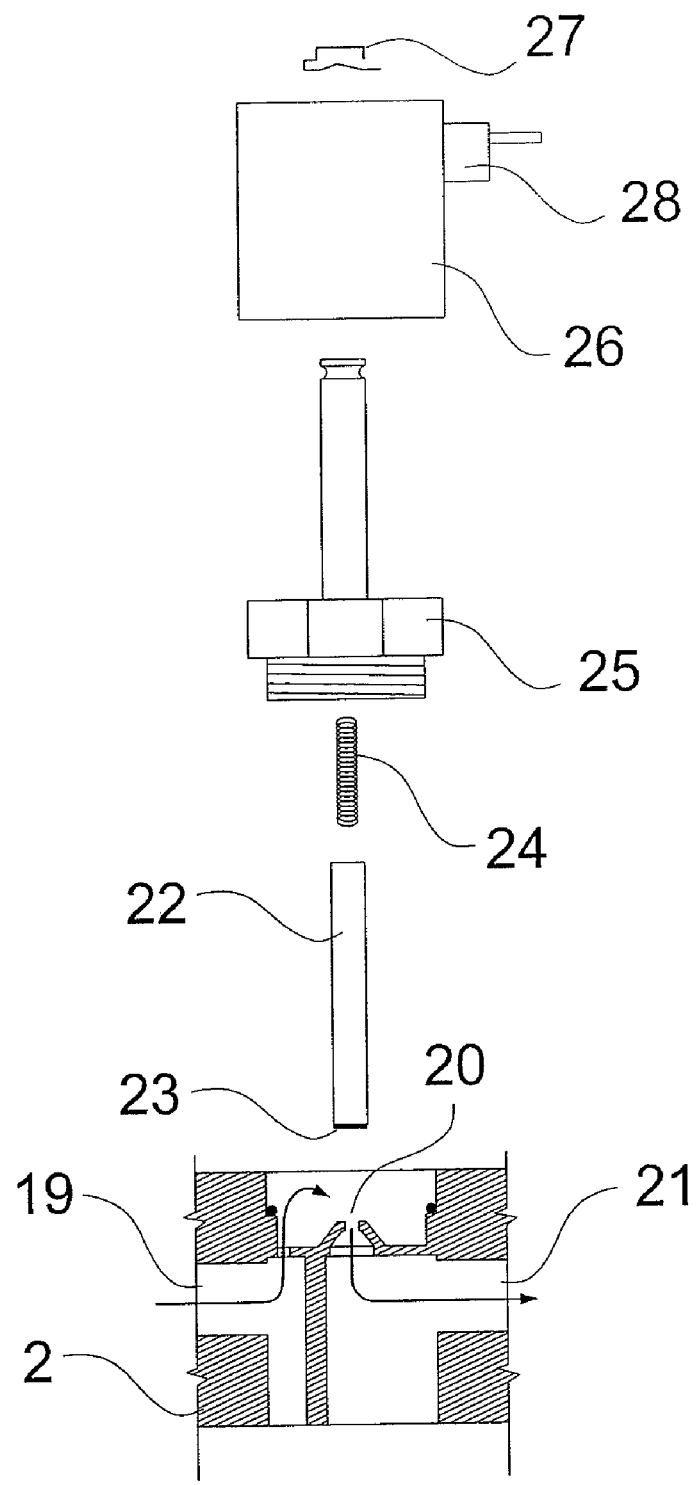
FIG. 2 is a sectional view taken along Section II-II of FIG. 4 and showing, disassembled, a solenoid valve on the secondary manifold block.

FIG. 2 shows a cut-away (section II-II of FIG. 4) of a solenoid valve on the secondary manifold block 2, shown disassembled. The secondary manifold block is designed so as to direct fluid from an inlet port 19, to port 20 and finally to the outlet port 21. A plunger 22 is acted on by spring 24. A gasket 23 is integral to the plunger. The spring and plunger are contained in housing 25. When housing 25 is assembled to the manifold block 2 the spring 24 causes the plunger to press against and seal port 20.

Electric coil 26 mounts on housing 25 and is retained by a clip 27. Wires for power are connected to terminals 28. Alternatively, flying leads which are integral to the coil could be employed, thus eliminating the need for terminals. When power is applied to the coil 26, plunger 22 is lifted due to the magnetic field. This opens port 20 so fluid can pass through inlet port 19 to outlet port 21.

Figure 3:
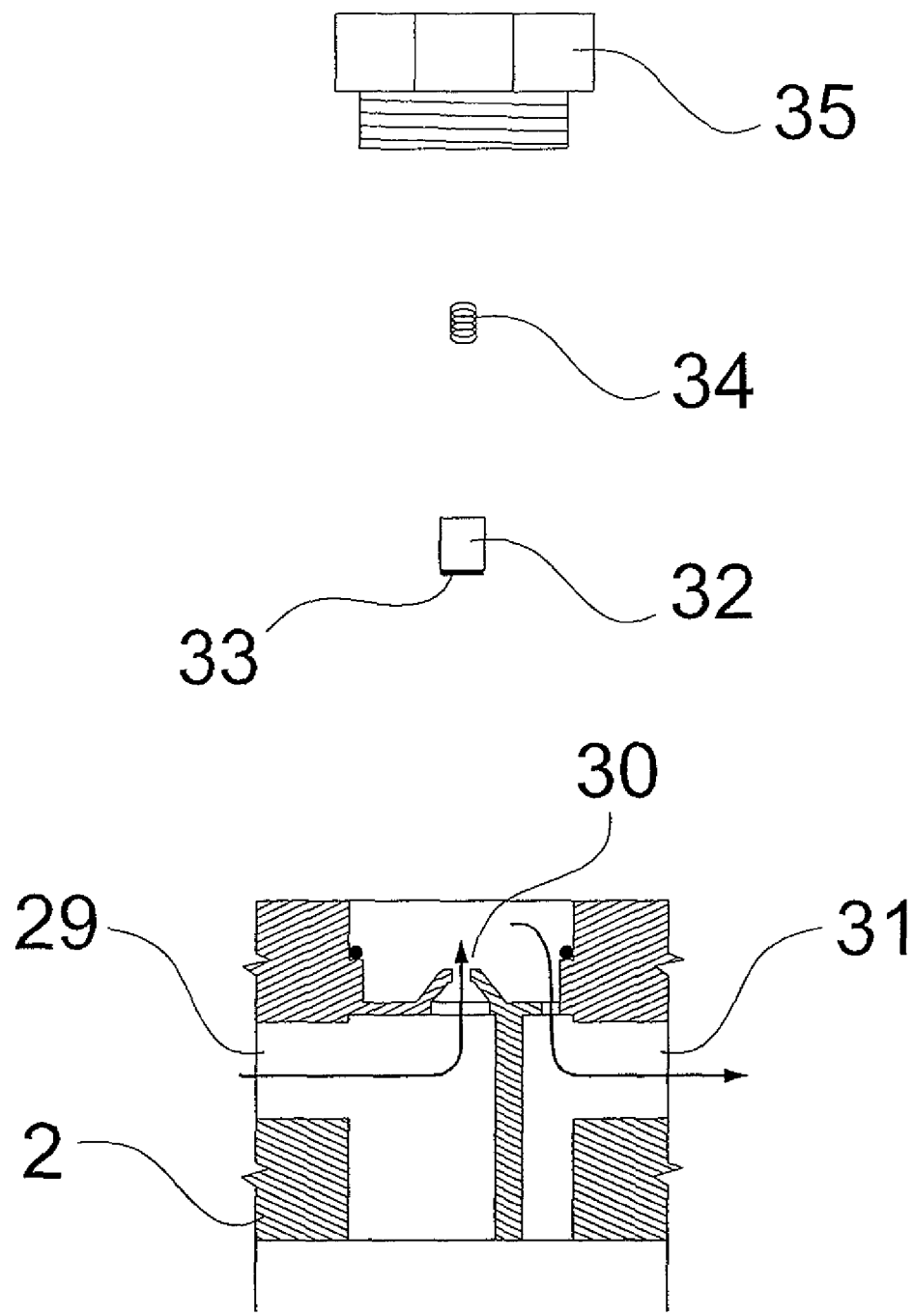
FIG. 3 is a sectional view taken along Section III-III of FIG. 4 and showing, disassembled, a check valve on the secondary manifold block.

FIG. 3 shows a cut-away (section III-III of FIG. 4) of a check valve on the secondary block 2, shown disassembled. The secondary manifold block 2 is designed so as to direct fluid from an inlet port 29 to port 30 and finally to the outlet port 31. A plunger 32 is acted on by spring 34. A gasket 33 is integral to the plunger. The spring and plunger are contained in housing 35. Spring 34 is designed so that a specified pressure at port 30 will cause plunger 32 to rise and therefore open port 30 so fluid can pass from inlet port 29 to outlet port 31. Fluid introduced at port 31 will not flow to port 29 since plunger 32 will be held against port 30 thereby blocking flow.

Referring to FIG. 1, electrical connections to electrically operated flow control devices such as solenoid valves, pressure switches and pressure transducers on the secondary manifold block 2 are made using wiring harness 36. Individual wires from the various devices are bundled and attached to a common plug 37. Pins 38 on the plug 37 mate with sockets 38a within plug 39. Wires 40 of the main equipment wiring harness are connected to plug 39.

FIG. 4 shows the assembled manifold. The primary manifold block 1 is keyed and secured to the secondary manifold block 2. The wiring harness 36 on the secondary manifold block is connected to the main equipment wiring harness 40. According to the method of the invention, the manifold is installed in the apparatus by permanently mounting the primary manifold block 1 in the apparatus, such as with fasteners, e.g. bolts, connecting the block to a frame of the apparatus, or by welding the block 1 to the frame of the apparatus.

Figure 5:
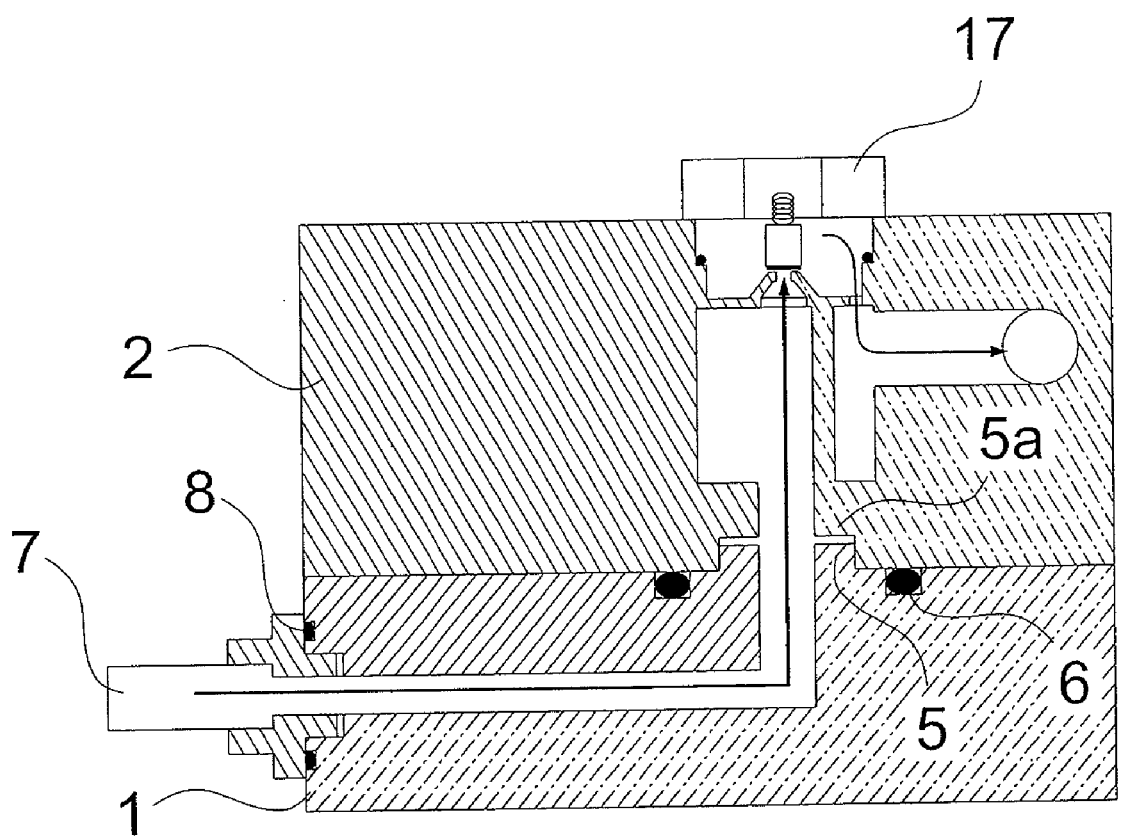
FIG. 5 is a sectional view taken along Section V-V of FIG. 4 and showing a check valve mounted in the secondary manifold block with an interconnecting fluid flow path to the primary manifold block and an external tube connected to a manifold port of the primary manifold block.

FIG. 5 shows a cut-away (section V-V of FIG. 4) of a check valve mounted in the secondary manifold block 2 with the interconnecting path to the primary manifold block 1 and a tube 7 connected to the primary manifold block 1.

Figure 6:
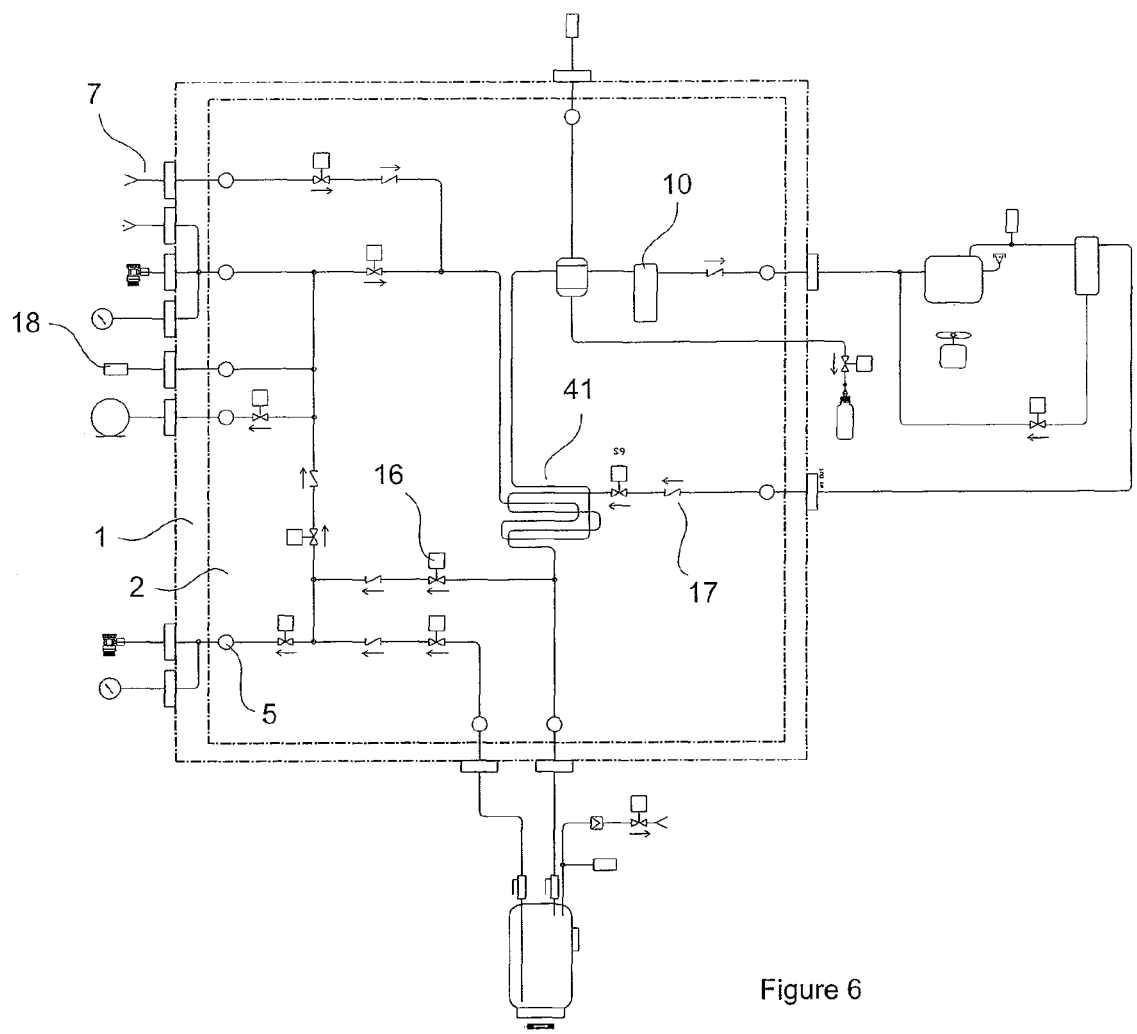
FIG. 6 is a flow diagram of components and their relationships and fluid flow paths to each other of the manifold of the invention in a refrigerant recycling machine according to the invention.

FIG. 6 shows a typical flow diagram of components and their relationships and fluid flow pathways to each other of the manifold for use in a refrigerant recycling machine. It does not relate directly to the components shown in FIG. 1, but rather illustrates the manifold concept within a complete machine.

Shown diagrammatically are the pathways internal to the individual manifold blocks. The fluid flow path will determine internal pathways between the various ports. The manifold design takes into account the transfer of heat from pathways with hot fluid and their relationship to pathways with cold fluid. A serpentine path 41 may be machined into the manifold specific to this purpose as shown in FIG. 6. Other path configurations are strategically arranged so as to utilize transfer of heat between cold fluid paths and hot fluid paths to effect movement of fluid due to differing pressures. Examples of flow circuits and refrigerant recycling machines in which the manifold of the present invention can be employed are shown in U.S. Pat. No. 5,094,087 and in U.S. Pat. Nos. 5,467,608; 5,533,358; and 5,570,590, and in commonly owned U.S. Pat. No. 5,598,714, but the manifold and fluid handling apparatus of the invention are not limited to the referenced complex flow circuits and refrigerant recycling apparatus.

The manifold of the invention facilitates assembly and disassembly in the equipment in which the manifold is used.

Assembly of the three major components (primary manifold block, secondary manifold block and wiring harness) is accomplished without the need for special assembler expertise. Disassembly for diagnostics or replacement purposes at a later time is just as simple. The complete secondary manifold block with integral wiring harness can be replaced in its entirety thus minimizing downtime of the equipment. The manifold is useful in equipment other than the refrigerant recycling machine of the example embodiment, including in other machines and equipment wherein it is necessary to direct and control fluids in a complex flow circuit.

While we have disclosed only one embodiment of the invention, the invention is not limited thereto but is susceptible to use in other forms without departing from the basic invention described herein and claimed in appended claims, as will be apparent to the skilled artisan.

We claim:

1. A refrigerant recycling machine having a complex flow circuit with a plurality of components and fluid flow paths to and from the components, the machine comprising:

a multiple block manifold for directing and controlling fluids in the complex flow circuit, the multiple block manifold including primary and secondary manifold blocks each having at least one external component of the plurality of components connected to the block at a port in an outer surface of the block and fluid flow paths formed in the block to and from the component and port;

the primary manifold block being permanently mounted in the machine and the secondary manifold block being removably mounted on the primary manifold block, the primary and secondary manifold blocks having mating surfaces which engage one another about aligned, opposing pairs of ports in the opposed mating surfaces of the blocks connecting the fluid flow paths in the blocks when the secondary manifold block is mounted on the primary manifold block;

at least one quick-connect connector releasably securing the secondary manifold block on the primary manifold block;

alignment means permanently provided on the primary and secondary manifold blocks apart from the opposing pairs of ports on the mating surfaces of the blocks for ensuring the blocks are assembled correctly and that the mating surfaces thereon are not damaged, the alignment means pre-aligning the blocks with respect to each other prior to engaging the mating surfaces thereon and before connecting the blocks with the at least one quick-connect connector during mounting of the secondary manifold block on the primary manifold block;

the plurality of components of the complex flow circuit including at least one component connected to the primary manifold block at a port in an outer surface of the block opposite the mating surface of the block, and a plurality of different flow control devices selected from the group consisting of solenoid valves, check valves, pressure switches and pressure transducers for controlling fluid flow in the fluid flow paths of the manifold and the complex flow circuit of the machine, the flow control devices being connected to the secondary manifold block at respective ports in an outer surface of the block opposite the mating surface of the block; and a plurality of manifold ports with connections to external tubes to convey fluid to and from the fluid flow paths in the manifold, the plurality of manifold ports being arranged in respective ones of a plurality of outer side surfaces of the primary manifold block.

2. The refrigerant recycling machine according to claim 1, wherein the plurality of flow control devices includes electrically operated flow control devices and the manifold includes a wiring harness integral to the secondary manifold block at said outer surface of the block opposite the mating surface of the block, the wiring harness having wires electrically connected to the electrically operated flow control devices.

3. The refrigerant recycling machine according to claim 2, wherein the electrical wires of the wiring harness are connected to a common electrical plug.

4. The refrigerant recycling machine according to claim 1, wherein all of the manifold ports of the manifold with connections for external tubes are isolated and integral to the primary manifold block and in said plurality of outer side surfaces of the block.

5. The refrigerant recycling machine according to claim 1, wherein all of the flow control devices of the manifold are integral to the secondary manifold block and in said outer surface of the block opposite the mating surface of the block.

6. The refrigerant recycling machine according to claim 1, wherein the primary and secondary manifold blocks are metal blocks with internal fluid flow paths machined into the manifold.

* * * * *